Dec. 27, 1966  E. E. SHARPE  3,293,967
TAPE SERVING DEVICE
Filed March 29, 1965  6 Sheets-Sheet 1

FIG. 1

INVENTOR.
EVERETT E. SHARPE
BY
Moses, McGlew & Toren
ATTORNEYS

FIG. 2

INVENTOR.
EVERETT E. SHARPE 3,293,967
TAPE SERVING DEVICE
Everett E. Sharpe, Shelton, Conn., assignor to Better Packages, Incorporated, a corporation of Delaware
Filed Mar. 29, 1965, Ser. No. 443,397
14 Claims. (Cl. 83—241)

This invention relates in general to strip material serving devices, and in particular to a new and useful device for dispensing selected lengths of strip material such as gummed package sealing tape.

The present invention is an improvement over the prior art, particularly in respect to the provision of simplified means for selectively feeding measured lengths of tape of at least two selectively adjustable preset lengths by operating a simple control such as a depress-button for the particular length desired.

In accordance with a preferred embodiment of the invention, the device advantageously includes selector means such as graduated dial elements for setting the lengths of strip material which will be fed when the mechanism associated with the dial is actuated for dispensing this length of material. After the length has been selected, the measuring means set by the dial is electrically connected to an actuating button or switch and a driving feed motor which drives through measuring means to dispense the length of material in accordance with the dial setting. The measuring means includes a rotatable measuring wheel or drum having a stop element which is adapted to be moved around with the drum and to contact a linkage for actuating a stop feed switch which in turn is moved thereby to disconnect the drive and stop the feed of strip material. The distance through which the stop element on the measuring drum will travel, and hence the length of the tape which is dispensed, will depend on the initial position of the stop element as set by a control dial.

In a still further feature of the invention, the machine advantageously includes at least two separate rotatable measuring wheels or drums which are selectively connected through a driving or feed motor in accordance with which selective control or push button is actuated. Each of the measuring wheels is advantageously provided with its own selector knob or dial control for varying the amount of rotation of the drum with its stop element and hence the time of operation of the feeding motor in dispensing a length of strip material. With such a construction it is possible to set the dial of one measuring drum, for example, to dispense a short length of strip material, and the other measuring drum may be set to dispense a long length of material. In such a case the machine may be operated by merely depressing an actuating button to dispense selectively either a long or short strip of material.

A feature of the construction is that the electrical circuitry permits the operation of the driving feed motor through a complete feed cycle after the actuating button is only held in a contact position for an instant and it is not necessary that the button be held in a depressed position during the dispensing operation.

In accordance with a still further feature of the invention, the strip material which is dispensed is fed between elements which support the material at the discharge end of the machine after it has been cut from a continuous roll thereof. The feeding mechanism will not operate to dispense a new length until means contacting the dispensed strip of material has been displaced which will occur only after the strip material which has already been fed is removed from the end of the machine.

A further feature of the invention is the provision of electrical means for permitting the dispensing of long and short strips of material in a selected sequence in accordance with the setting of a stepping switch which is connected to the driving motor and feed mechanism. The stepping switch operates to selectively actuate one or the other of the measuring rollers in accordance with the presetting of the electrical connections of the stepping switch to dispense the length of strip material in the sequence selected.

The device may also be operated by a robot setting position of the electrical circuitry which permits driving through a selected one of the measuring wheels only so that the same length of strip material will be fed outwardly from the machine after each strip which has been cut in each feeding cycle is first removed.

Accordingly, it is an object of this invention to provide an improved strip material dispensing device including means for permitting the dispensing of two different lengths of strip material.

A further object of the invention is to provide a strip material dispensing device which includes means for preselecting at least two separate measuring elements for selective connection to a driving feed motor to dispense a length of strip material in accordance with the setting of the measuring elements and wherein each of the measuring elements may be selected for operation in a simple manner such as by depressing a push button control.

A further object of the invention is to provide a strip material dispensing device which permits the dispensing of a measured length of strip material automatically upon the removal of each strip as it is dispensed, and which further includes means for presetting the length of material which will be fed during each dispensing operation in a continuously operating sequence.

A further object of the invention is to provide a device for serving strip material which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 5:
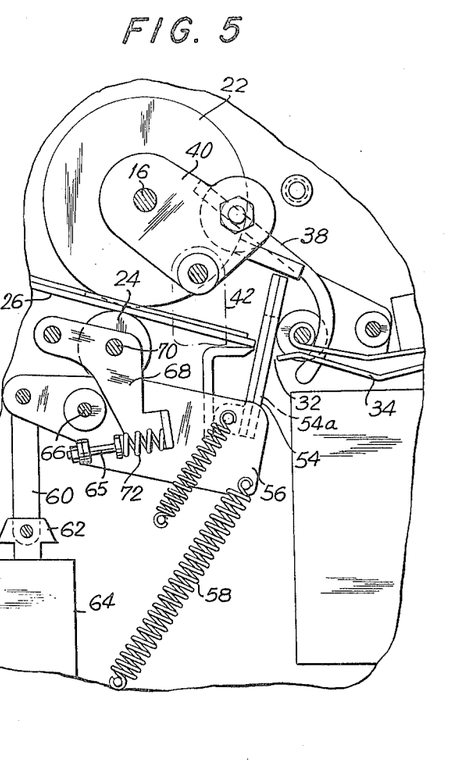
FIG. 5 is a section taken on the line 5—5 of FIG. 2.
Figure 6:
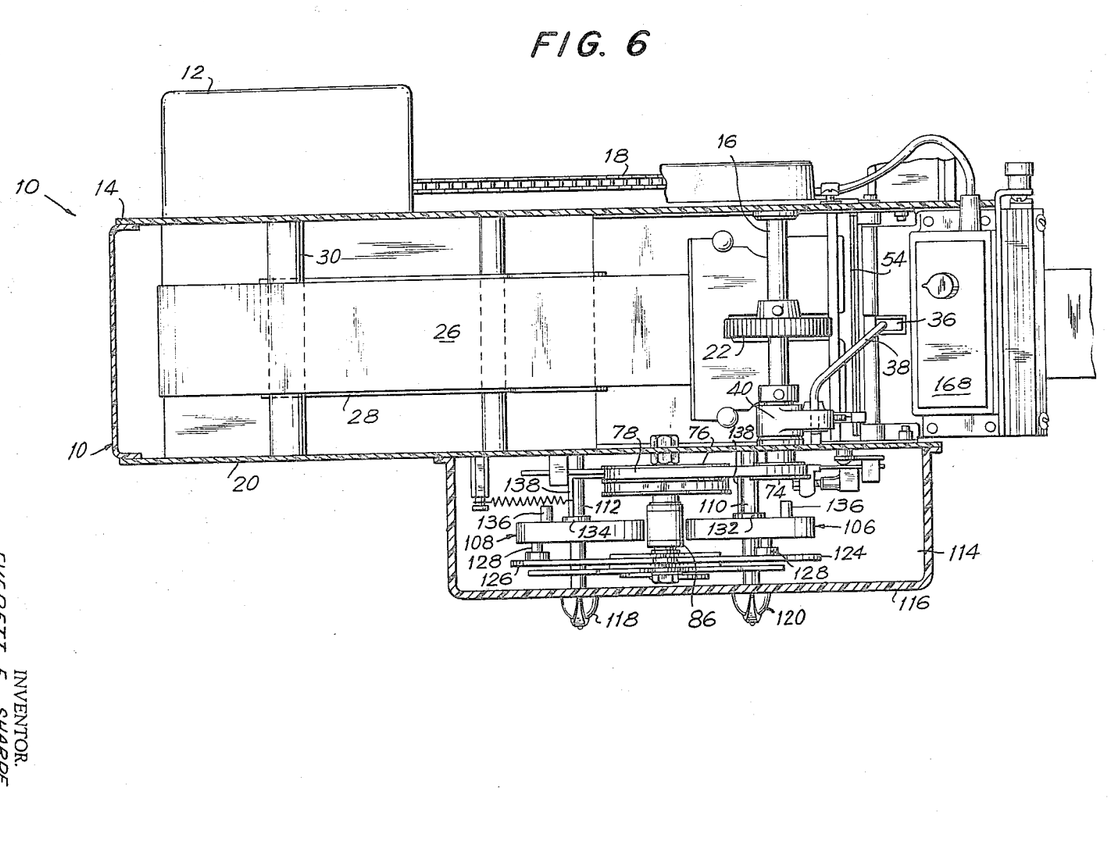
FIG. 6 is a section taken on the line 6—6 of FIG. 1.
Figure 7:
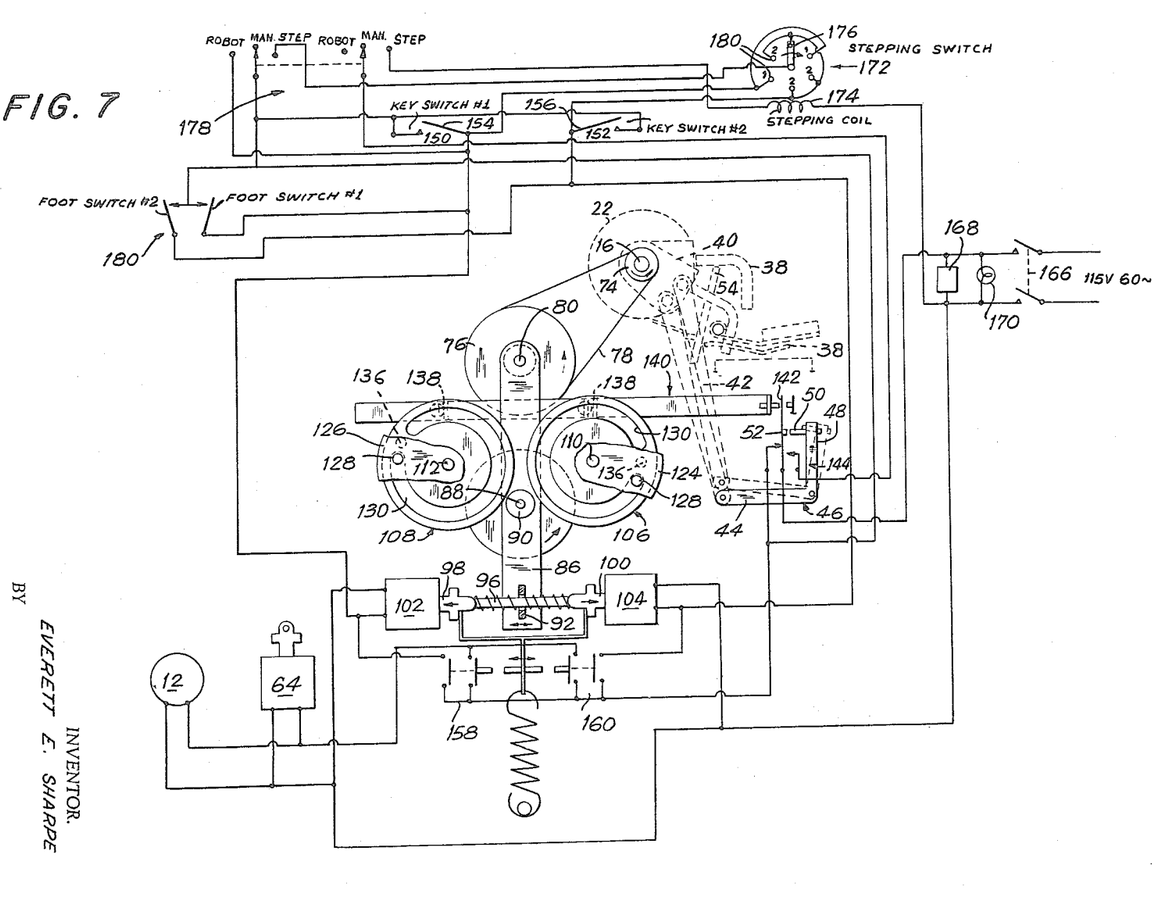
FIG. 7 is a schematic wiring diagram for the machine.

Referring to the drawings in particular, the invention embodied therein comprises a strip material measuring and dispensing device generally designated 10 which includes an electric driving motor 12 (FIG. 6) which is mounted on a side wall 14 and drives a drive shaft or feed shaft 16 through a timing chain 18 (FIGS. 2 and 6) affixed to the motor shaft (not shown). The feed shaft 16 is rotatably supported between the wall 14 and an opposite end wall 20 and it carries a feed wheel or knurled roller 22 which rotates in conjunction with a counter roller 24 (FIG. 5) to dispense a measured quantity of tape or strip material 26 from a roll 28 which is carried in the housing. As best indicated in FIGS. 5, 6 and 7, the tape 26 is fed between the rollers 22 and 24 and is delivered over a slot 32 onto a discharge plate 34 having a central slot or opening 36 (FIG. 6) for a control finger or actuating finger 38. The control finger 38 is carried on the upper end of a block member 40 which is freely rotatable on the drive shaft 16. The block member 40 is pivotally connected at its lower end to a link member 42 (FIG. 7) which in turn is pivotally connected at its opposite end to one arm 44 of a rocking lever generally designated 46. The rocking lever 46 includes another arm 48 having a contact 50 thereon which will be electrically connected with a fixed contact 52 only when the finger 38 is in a down position extending through the slot 36 which will occur only when the tape which has been fed during the previous cycle is removed from the end of the machine.

A guillotine-type knife 54 is arranged to reciprocate within the slot 32 to sever the tape, which is fed by the rollers 22 and 24, at the end of the feeding cycle (FIG. 5). The knife 54 is carried on the end of a pivotal lever member 56 which is biased downwardly at one end by a spring 58 and has an opposite end connected to a connecting rod element 60 pivotally secured to a plunger 62 of a solenoid 64. When the solenoid 64 is deenergized, the lever member 56 is rotated by the spring 58 to cause the knife 54 to be pulled downwardly to sever the tape covering the slot 32. The solenoid 64 is electrically actuated in the cycle at the same time as the motor 12 to cause the plunger 62 to move downwardly to the position indicated in FIG. 5 to rock member 56 counterclockwise to cause the adjusting screw 65 on the member to push against the arm 68 carrying the lower feed wheel 24 to engage the tape between it and roller 22 and feed the tape through an opening 54a of the knife 54 which becomes aligned with the tape as the knife is moved upwardly by the movement of the member 56. After a selected length of tape has been fed by the rollers 22 and 24, the knife 54 will again be moved to cut the fed length of tape by the spring 58 after the solenoid has been stopped by the feed measuring means. The lever member 56 is pivotally mounted on a pivot member 66.

A crank lever 68 is pivotally mounted at 70 and is resiliently connected to the lever member 56 through a spring 72. The crank lever 68 carries the counter roller 24 which is moved into driving engagement with the feed roller 22 under the control of the solenoid 64 when the knife 54 is moved to a position which permits feeding of the tape material therethrough and when the finger 38 is in a downward position.

Figure 3:
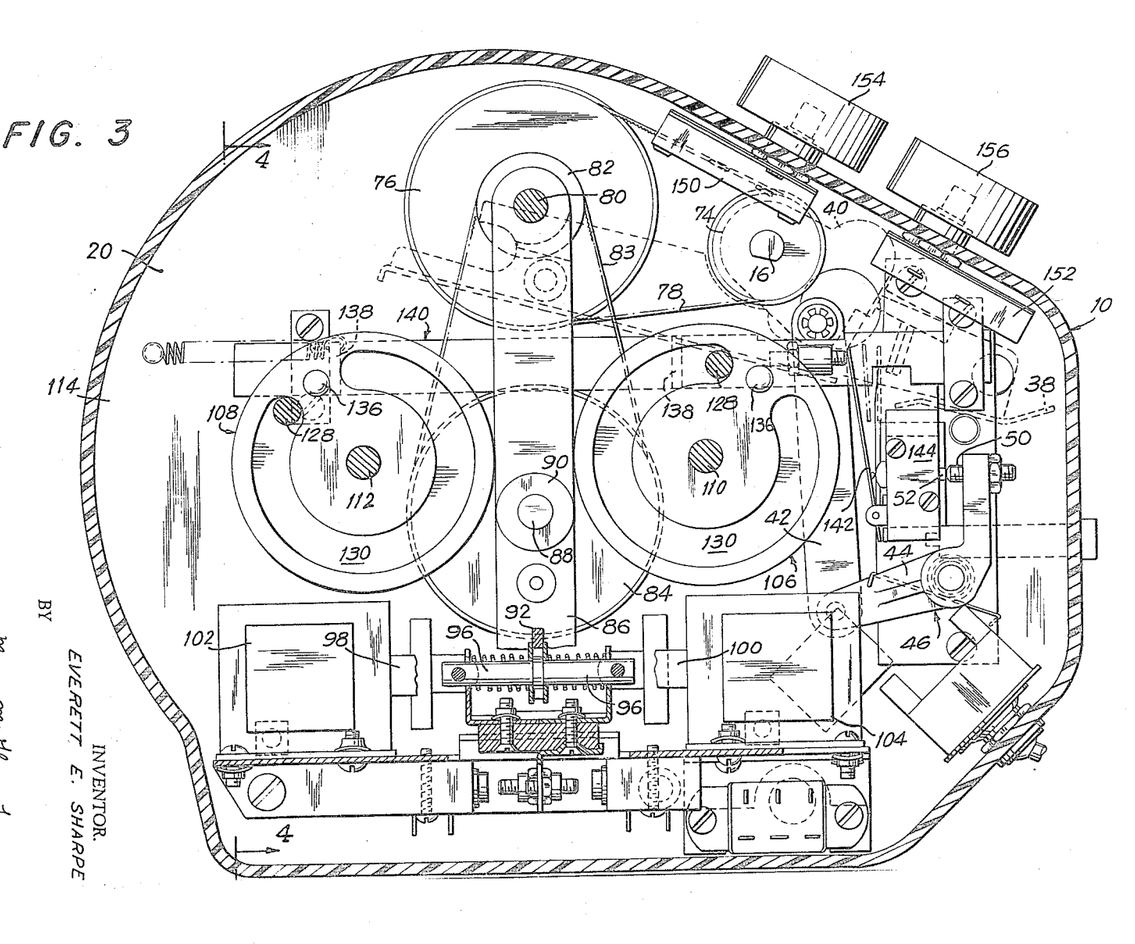
FIG. 3 is a section taken on the line 3—3 of FIG. 2.
Figure 4:
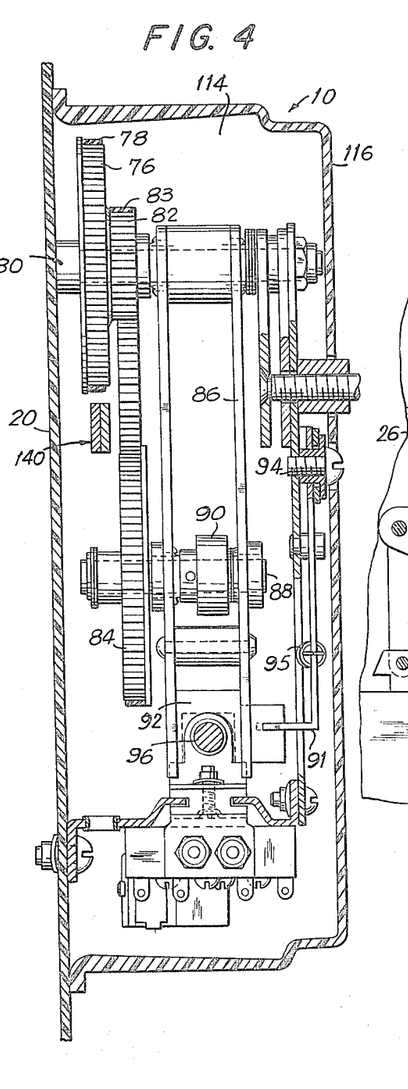
FIG. 4 is a section taken on the line 4—4 of FIG. 1.

As best indicated in FIGS. 3 and 7, a pulley 74 is secured to the drive shaft 16 and it drives an intermediate pulley 76 through a belt 78. The pulley 76 is secured on a shaft 80 which carries a pulley 82 which in turn drives through belt 83 a pulley 84 carried at the outer end of a spindle arm 86 which is pivotal on the shaft 80.

Figure 1:
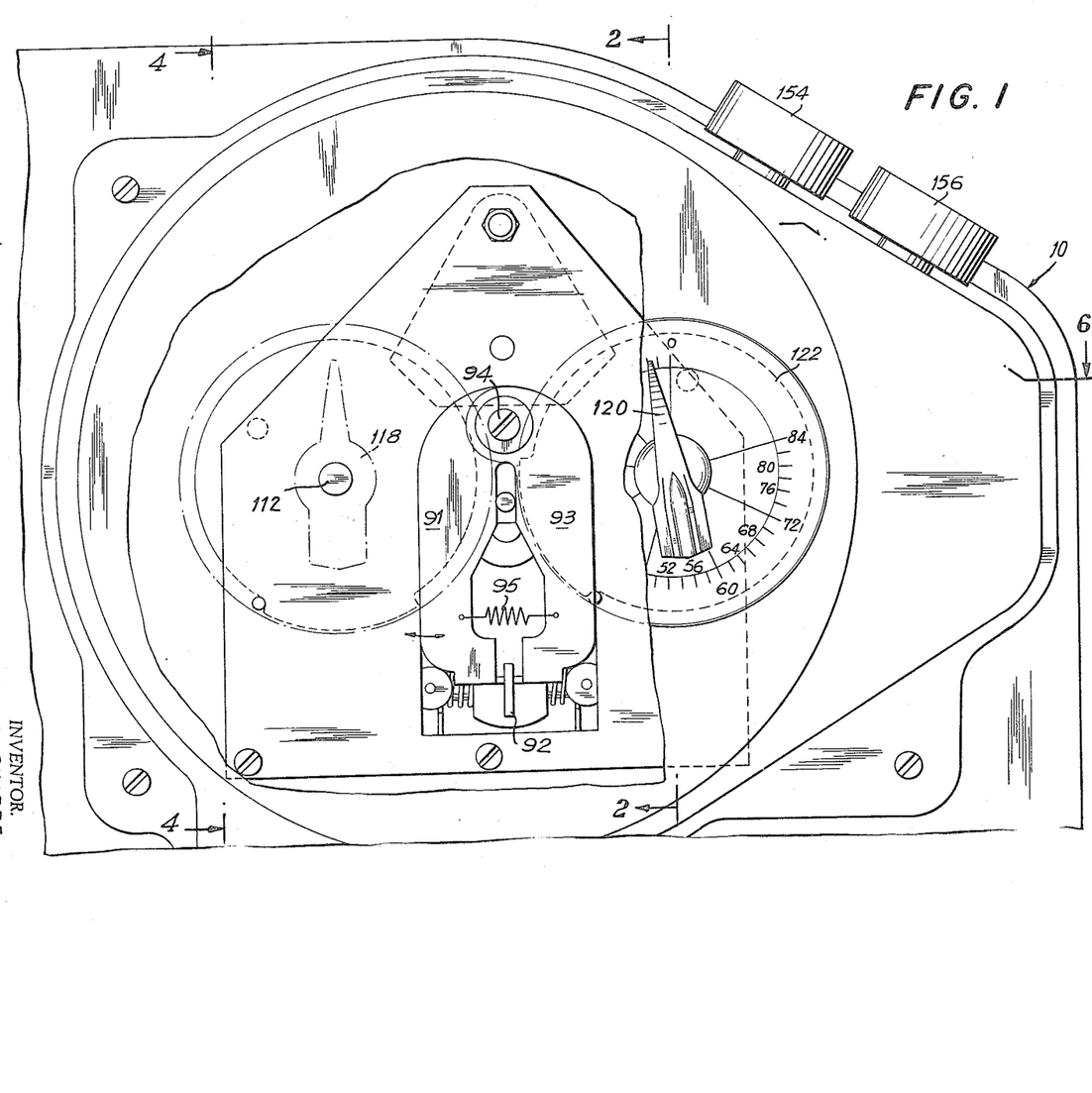
FIG. 1 is an end elevational view, with the cover portion partly removed, of a tape dispensing machine constructed in accordance with the invention.
Figure 2:
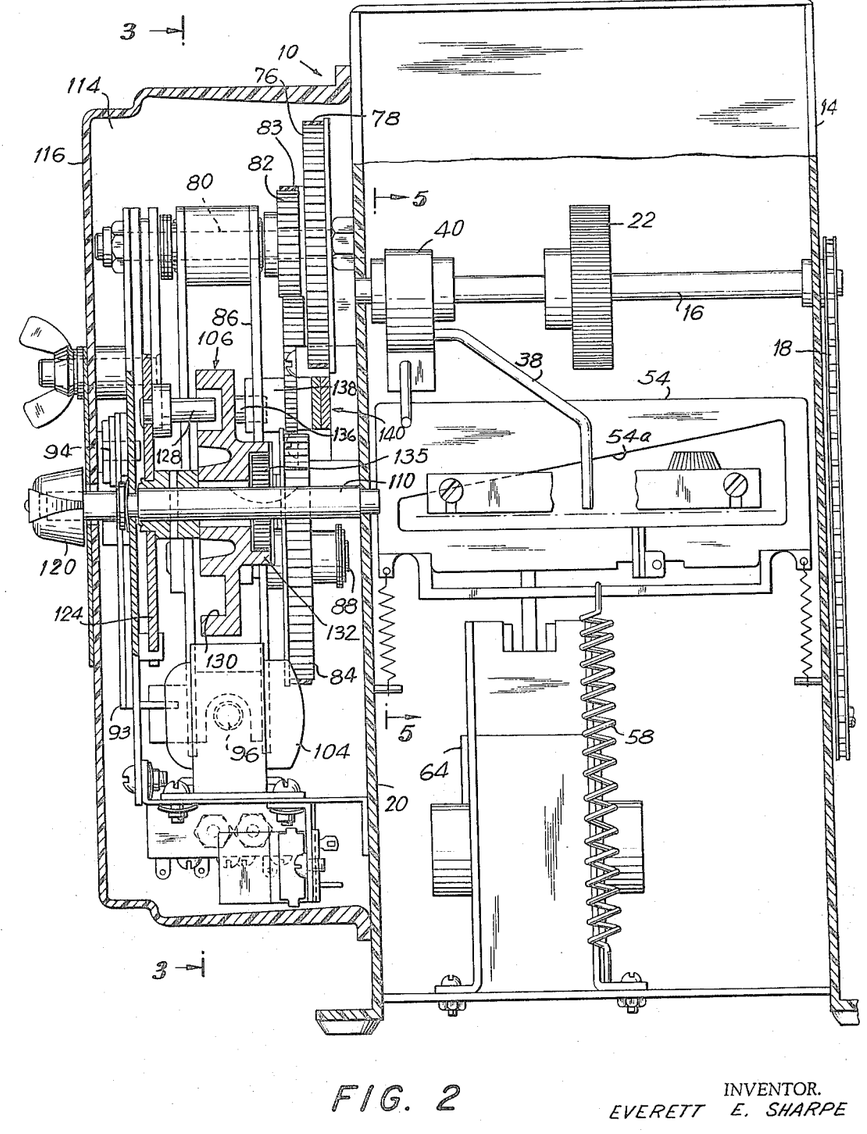
FIG. 2 is a section taken on the line 2—2 of FIG. 1.

In accordance with the invention, the pulley 84 is secured to a shaft 88 which carries a clutching roller or measuring drive roller 90. The spindle 86 carries a cross plate 92 at its lower end which opposes respective opposite ends of return arm members 91 and 93, as indicated in FIG. 1. The return arm members are pivotally mounted at 94 and are biased to a central position opposite each side of plate 92 by a spring 95. The arm members 91 and 93 act to center a central connecting member 96 (FIG. 7) and the spindle 86 which is connected thereto through the plate 92. The connecting member 96 is connected at respective ends to solenoid plungers 98 and 100 associated with solenoids 102 and 104, respectively.

Electrical actuation of solenoid 104 causes the inward movement of the plunger 100 and the movement of the spindle 86 to the right, as indicated in FIG. 3 of the drawings, to move the driving wheel 90 into driving contact with a measuring roller generally designated 106. Actuation of the solenoid 102 causes the inward movement of the plunger 98 and a displacement of the spindle 86 to the left and to position the roller 90 in driving engagement with a measuring roller generally designated 108.

The measuring rollers 106 and 108 are rotatable about respective shafts 110 and 112 and are part of measuring means associated with the drive and with the driving motor for measuring the length of feed or the engagement of the feed roller 22 with the counter roller 24 during a dispensing cycle.

In accordance with the invention, the measuring means for determining the length of tape which is fed during every driving cycle is located externally of the wall 20 within a compartment 114 closed by a cover element 116 and includes the rotatable shafts 110 and 112 which are rotatable in the cover 116 as well as in the wall 20. Respective knobs or dials 118 and 120 are secured to shafts 112 and 110 and each is associated with a scaled disk or indicator 122 with graduations indicating the length of tape which may be selected by rotation of the knobs (see FIGS. 1, 2 and 6). Also secured to the shafts 110 and 112 within the cover 116 are setting disks or stop elements 124 and 126 each carrying projecting stop member 128 which is confined in an annular slot defined in the respective measuring wheels 106 and 108 (see FIGS. 3 and 6). Each measuring wheel 106 and 108 includes a hub portion 132 and 134 having a torsion spring 135 (FIG. 2) which biases the wheel to rotate in a counterclockwise direction against the stop member 128 carried on the associated stop elements 124 and 126, respectively. When either of the knobs 118 or 120 is rotated, they permit a corresponding rotation of the measuring wheels 106 or 108 under the influence of the torsion spring 135 to maintain the stop elements 128 at the end of slots 130. In this manner, the start or rest position of the measuring wheels 106 and 108 is set.

If the solenoid 102 is actuated, the extension 96 causes the spindle 86 to be moved to the left to cause driving engagement of the clutch roller 90 with the measuring wheel 108. In accordance with the setting of the stop 128, the wheel 108 will be moved around until a projection or actuating element 136, extending outwardly from a side thereof opposite from the side at which the stop elements 124 and 126 are located, is moved against a transverse portion 138 of a slide bar generally designated 140 to displace the slide bar to the right, as indicated in FIGS. 3 and 6. The slide bar 140, in turn, displaces a movable contact member 142 of a resettable-type cut-out switch 144 which also contains the contacts for the actuating finger 38. Displacement of the movable contact 142 causes the stopping of the motor feed and a deactivation of the solenoid 102. When this occurs, the selected length of tape has been fed out by the feed roller 22 and the force of the spring causes rotation of the member 56 and the displacement of the knife 54 downwardly to the tape. The cut tape will remain in position on the discharge plate 34, however, with the finger 38 resting thereon. When the tape is removed by an operator, the finger 38 will then drop into the slot 36 (see FIGS. 5 and 6) to reset the switch 144 so that an operating cycle may be again started.

In accordance with a further feature of the invention, the knobs 118 and 120 may be set for delivering, for example, a relatively long piece of tape and a relatively short piece of tape, respectively. Thereafter, the electrical circuit is such, as indicated in FIG. 7, to permit the dispensing of tape after removal of the last cut piece of tape in one or more of the following manners:

(1) A simple push button operation is provided which includes switches 150 and 152 mounted within the housing and having large size push button control elements 154 and 156 located outside the housing in a very accessible position. The switches 150 and 152 are connected electrically, as indicated in FIG. 7, to respective control switches 158 and 160, as well as to solenoid 64 and motor 12. When a push button 154 or 156 is pushed and it may be immediately released, then either solenoid 102 or 104 is actuated to pull the connecting arm 96 in the direction of the actuated solenoid. This causes the plate 92 to be moved against either an arm 91 or 93 to displace it against the face of the biasing spring 95. When the respective solenoid is deenergized, the spring 95 causes the associated arms 91 or 93 to move back to a central position and to center the plate 92 and the respective solenoid plungers in a deactivated withdrawn position (see FIGS. 1, 3 and 7).

Referring to FIG. 7, the power is received from a 115-volt, 60-cycle line and is delivered through an on-off switch 166 to a top heater 168. A pilot light 170 is provided to indicate when the power is being supplied.

(2) In accordance with another feature of the invention, the electrical circuit includes a stepping switch generally designated 172 having a stepping coil 174 for actuation of a rotary arm or bar contact 176 in a timed sequence to permit automatic dispensing of tape in preselected lengths (FIG. 7). For this purpose a double pole double throw mode switch 178 is provided for permitting a selection between manual operation, stepping operation, and robot operation.

When the mode switch 178 is in the stepping position, the machine is controlled by the stepping switch 172 and its associated stepping coil 174 to dispense a series of long and short strips in a sequence predetermined by the way contacts 180 of the stepping switch are wired into the circuit. The schematic diagram (FIG. 7) shows the stepping switch 172 wired for a continuous sequence of two short and one long.

The contacts 180 of the stepping switch are wired into the circuit so that they are wired across either key switch 150 or 152 depending on which measuring system is desired from that contact.

The stepping coil is wired so that when the cut-out switch 144 is operated by the trip bar, cutting off the current to the measuring and feeding system of the machine, current is fed to the stepping coil 174 through the other contact of the cut-out switch.

This energizes the stepping coil and moves the stepping switch bar contact 176 to its next control contact 180. Withdrawing the strip of tape from the machine allows the reset lever 38 to reset the cut-out switch initiating the next dispensing cycle selected by previous off period of the feeding cycle. It also cuts the current to the stepping coil 174 until the next off period between feeding cycles.

When the mode switch 178 is set in the manual position, the feed will not operate unless one or the other of the push buttons are depressed as set forth in operation Example 1. Of course, the push buttons 154 and 156 need not be held down, but need only make initial contact and thereafter the feeding will be automatic.

(3) When the mode switch 176 is set in the robot position, the feed will be automatic in respect to the measurement which is accomplished, for example, by only one of the measuring wheels 106 or 108, and in the embodiment illustrated only for the wheel 108. In all instances, the operation will occur only after the length of tape which is fed during the cycle is removed by the operator to permit the finger 38 to reset the electrical mechanism.

In some instances it is desirable to have an additional foot control 180 for the cutting in or out of the operation of the device.

While a specific embodiment of the invention has been shown and described in detail to illustrate the application of the inventive principles, it will be understood that the invention may be embodied otherwise without departing from such principles.

What is claimed is:

1. A machine for dispensing strip material comprising means for feeding a length of strip material, first and second rotatable drums selectively connectible to said feeding means for measuring the length of strip material being fed by said feeding means, means for selectively connecting said first and second rotatable drums to said feeding means, and control means connected to said feeding means and including a member disposed for actuation by a predetermined movement of said first and second movable drums to stop said feeding means.

2. A machine for dispensing strip material comprising means for feeding a length of strip material, movable measuring means connectible to said feeding means for measuring the length of strip material fed by said feeding means, said movable measuring means including a plurality of separate movable elements, control means disposed for actuation upon a predetermined movement of each of said movable elements and connected to said feed means to stop said feed means, means for separately adjusting the initial position of said movable elements in relation to said control means for varying the distance of movement before actuating said control means and therefore the amount of time at which said feeding means will be operative, and means for selectively connecting one of said movable elements to said feed means for actuating said control means in accordance with which of said movable elements is selected.

3. A machine for dispensing strip material comprising means for feeding a length of strip material, movable measuring means connectible to said feeding means for measuring the length of strip material fed by said feeding means, said movable measuring means including a plurality of separate movable elements, control means disposed for actuation upon a predetermined movement of said movable element and connected to said feed means to stop said feed means, means for separately adjusting the initial position of said movable elements in relation to said control means for varying the distance to said control means and therefore the amount of time at which said feeding means will be operative, means for selectively connecting one of said movable elements to said feed means for actuating said control means in accordance with which of said movable elements is selected, means connected to said feeding means for severing said strip material which is fed by said feeding means after said feeding means has stopped, and sensing means adapted to contact the material which is fed by said feeding means and being connected to said feeding means to prevent operation thereof until the material has been withdrawn from said sensing means.

4. A machine for dispensing strip material comprising means for feeding a length of strip material, movable measuring means connectible to said feeding means for measuring the length of strip material fed by said feeding means, said movable measuring means including a plurality of separate movable elements, control means disposed for actuation upon a predetermined movement of said movable element and connected to said feed means to stop said feed means, means for separately adjusting the initial position of said movable elements in relation to said control means for varying the distance to said control means and therefore the amount of time at which said feeding means will be operative, and means for selectively connecting one of said movable elements to said feed means for actuating said control means in accordance with which of said movable elements is selected including a plurality of electrically operated push button control elements and solenoid means connected to each of said push button control elements and to corresponding ones of said movable elements for connecting said movable elements to said feeding means.

5. A machine for dispensing strip material comprising means for feeding a length of strip material, movable measuring means connectible to said feeding means for measuring the length of strip material fed by said feeding means, said movable measuring means including a plurality of separate movable elements, control means disposed for actuation upon a predetermined movement of said movable element and connected to said feed means to stop said feed means, means for separately adjusting the initial position of said movable elements in relation to said control means for varying the distance to said control means and therefore the amount of time at which said feeding means will be operative, and means for selectively connecting one of said movable elements to said feed means for actuating said control means in accordance with which of said movable elements is selected, said movable measuring means comprising individual rotatable drums, a rotatable clutch wheel connected to said feeding means and rotatable upon actuation of said feeding means, said selecting means including a movable spindle carrying said rotatable clutch wheel and being movable toward a selected one of said movable measuring drums for mechanically coupling said drum, said clutch wheel and said feeding means.

6. A machine for dispensing strip material comprising means for feeding a length of strip material including a rotatable roller element adapted to contact said strip material as it is fed, a spindle pivotally mounted adjacent its one end, first and second rotatable measuring wheels located adjacent said spindle, a rotatable clutch wheel rotatably mounted on said spindle and connected to said feeding means and being rotatable upon initiation of said feeding means, switch means for selectively moving said spindle toward a respective one of said first and second measuring wheels to cause said clutch wheel to drivingly engage the respective measuring wheel, and a movable member disposed adjacent said first and second measuring wheels and being engageable upon predetermined movement of the one of said measuring wheels which is engaged with said rotatable clutch to stop said feeding means.

7. A machine for dispensing strip material comprising means for feeding a length of strip material including a rotatable roller element adapted to contact said strip material as it is fed, a spindle pivotally mounted adjacent its one end, first and second rotatable measuring wheels located adjacent said spindle, a rotatable clutch wheel rotatably mounted on said spindle and connected to said feeding means and being rotatable upon initiation of said feeding means, switch means for selectively moving said spindle toward a respective one of said first and second measuring wheels to cause said clutch wheel to drivingly engage the respective measuring wheel, and switch means disposed adjacent said first and second measuring wheels and adapted to be actuated upon predetermined movement of either of said measuring wheels to stop said feeding means.

8. A machine for dispensing strip material comprising means for feeding a length of strip material including a rotatable roller element adapted to contact said strip material as it is fed, a spindle pivotally mounted adjacent its one end, first and second rotatable measuring wheels located adjacent said spindle, a rotatable clutch wheel rotatably mounted on said spindle connected to said feed means and being rotatable upon initiation of said feed means, switch means for selectively moving said spindle toward a respective one of said first and second measuring wheels to cause said clutch wheel to drivingly engage the respective measuring wheel, a switch for stopping said feed means connected to said feed means and disposed adjacent said first and second measuring wheel, and means adjacent said measuring wheels being movable upon a predetermined movement of either one of said measuring wheels to actuate said switch for stopping said feed means.

9. A machine for dispensing strip material comprising means for feeding a length of strip material including a rotatable roller element adapted to contact said strip material as it is fed, a spindle pivotally mounted adjacent its one end, first and second rotatable measuring wheels located adjacent said spindle, a rotatable clutch wheel rotatably mounted on said spindle connected to said feed means and being rotatable upon initiation of said feed means, switch means for selectively moving said spindle toward a respective one of said first and second measuring wheels to cause said clutch wheel to drivingly engage the respective measuring wheel, a switch connected to said feeding means for stopping said feeding means, a member movably mounted adjacent said first and second measuring wheels and movable toward and away from said switch, and actuating means carried by each of said measuring wheels and movable upon a predetermined movement of the associated wheel into engagement with said member.

10. A machine for dispensing strip material comprising a driving motor, a drive shaft connected to said motor and rotatable thereby, a feed roller mounted on said drive shaft for rotation therewith and engageable with the strip material for advancing the strip material, a discharge plate located adjacent said feed roller, a spindle pivotally mounted adjacent its one end, first and second rotatable measuring wheels located on respective sides of said spindle, a rotatable clutch wheel rotatably mounted on said spindle and connected to said motor for rotation thereby, a slide member mounted adjacent said first and second measuring wheels, said measuring wheels each having an actuating element adapted to contact said slide member upon rotation of said wheels and to displace said slide member after contacting same, a motor cut-off switch connected to said motor and disposed adjacent said slide member in a position to be actuated upon displacement of said slide member to stop said motor, first and second push buttons for operating first and second measuring wheels respectively, and solenoid switch means connected to said first and second push buttons and to said spindle for displacing the spindle with the driving clutch wheel into engagement with the respective one of said first and second measuring wheels and to cause said driving clutch member to rotate said measuring wheel to engage said slide member and displace said slide member into contact with said switch means to cause stopping of said motor.

11. A machine for dispensing strip material comprising a driving motor, a drive shaft connected to said motor and rotatable thereby, a feed roller mounted on said drive shaft for rotation therewith, a rotatable counter roller engageable with said drive roller for feeding strip material therebetween, means for moving said counter roller into and out of feeding cooperation with said driving roller for advancing strip material therebetween, a discharge plate located adjacent said drive roller and said counter roller, said drive roller and said counter roller being arranged to direct material which has been fed onto said discharge plate, cutter means between said discharge plate and said drive roller for severing strip material after said drive roller and said counter roller are moved out of engagement, sensing means adjacent said discharge roller and overlying said discharge plate and adapted to engage the material fed by said feed roller and said counter roller and connected to said motor to interrupt said motor when a length of strip material is on said discharge plate, a spindle pivotally mounted adjacent its one end, first and second rotatable measuring wheels located on respective sides of said spindle, a rotatable clutch wheel rotatably mounted on said spindle and connected to said motor for rotation thereby, a slide member mounted adjacent said first and second measuring wheels, said measuring wheels each having an actuating element adapted to contact said slide member upon rotation of said wheels to displace said slide member, a motor cut-off switch connected to said motor and disposed adjacent said slide member in a position to be actuated upon displacement of said slide member to stop said motor and to actuate said cutter knife, first and second push buttons for operating first and second measuring wheels respectively, and solenoid switch means connected to said first and second push buttons and to said motor and to said spindle for displacing the spindle with the driving clutch wheel into engagement with the respective one of said first and second measuring wheels, to cause said driving clutch member to rotate said measuring wheel to engage said slide member and displace said slide member into contact with said switch means to cause stopping of said motor, and selector means connected to each of said first and second measuring wheels for varying the amount of rotation thereof after engagement with said clutch wheel before contacting said slide member.

12. A machine for dispensing strip material comprising a driving motor, feed roller means connected to said motor and rotatable thereby, a spindle pivotally mounted adjacent its one end, first and second rotatable measuring wheels located on respective sides of said spindle, a rotatable clutch wheel rotatably mounted on said spindle and connected to said motor for rotation thereby, a slide member mounted adjacent said first and second measuring wheels, said measuring wheels each having an actuating element adapted to contact said slide member upon rotation of said wheels to displace said slide member, a motor cut-off switch connected to said motor and disposed adjacent said slide member in a position to be actuated upon displacement of said slide member to stop said motor and to actuate said cutter knife, first and second push buttons for operating first and second measuring wheels respectively, solenoid switch means connected to said first and second push buttons and to said motor and to said spindle for displacing the spindle with the driving clutch wheel into engagement with the respective one of said first and second measuring wheels, to cause said driving clutch member to rotate said measuring wheel to engage said slide member and displace said slide member into contact with said switch means to cause stopping of said motor, and selector means connected to each of said first and second measuring wheels for varying the amount of rotation thereof after engagement with said clutch wheel before contacting said sliding member, including a rotatable disk member having a projecting stop thereon, each of said measuring wheels having an annular slot, said stop projecting into the annular slide of said measuring wheels, means for biasing said wheels to cause the stop to abut against the end of the slot defined in siad measuring wheels.

13. A machine for dispensing strip material comprising a driving motor, a drive shaft connected to said motor and rotatable thereby, a feed roller mounted on said drive shaft for rotation therewith, a rotatable counter roller engageable with said drive roller for feeding strip material therebetween, means for moving said counter roller into and out of feeding cooperation with said driving roller for advancing strip material therebetween, a discharge plate located adjacent said drive roller and said counter roller, said drive roller and said counter roller being arranged to direct material which has been fed onto said discharge plate, cutter means between said discharge plate and said drive roller for severing strip material after said drive roller and said counter roller are moved out of engagement, sensing means adjacent said discharge roller adapted to engage the material fed by said feed roller and said counter roller and connected to said motor to interrupt said motor when a length of strip material is on said discharge plate, a spindle pivotally mounted adjacent its one end, first and second rotatable measuring wheels located on respective sides of said spindle, a rotatable clutch wheel rotatably mounted on said spindle and connected to said motor for rotation thereby, a slide member mounted adjacent said first and second measuring wheels, said measuring wheels each having an actuating element adapted to contact said slide member upon rotation of said wheels to displace said slide member, a motor cut-off switch connected to said motor and disposed adjacent said slide member in a position to be actuated upon displacement of said slide member to stop said motor and to actuate said cutter knife, first and second push buttons for operating first and second measuring wheels respectively, and solenoid switch means connected to said first and second push buttons and to said motor and to said spindle for displacing the spindle with the driving clutch wheel into engagement with the respective one of said first and second measuring wheels, to cause said driving clutch member to rotate said measuring wheel to engage said slide member and displace said slide member into contact with said switch means to cause stopping of said motor, including a first solenoid for shifting said spindle member toward engagement with said first measuring wheel and a second solenoid for shifting said spindle member toward engagement with a second solenoid wheel.

14. A machine for dispensing strip material comprising a driving motor, a drive shaft connected to said motor and rotatable thereby, a feed roller mounted on said drive shaft for rotation therewith, a rotatable counter roller engageable with said drive roller for feeding strip material therebetween, means for moving said counter roller into and out of feeding cooperation with said driving roller for advancing strip material therebetween, a discharge plate located adjacent said drive roller and said counter roller, said drive roller and said counter roller being arranged to direct material which has been fed onto said discharge plate, cutter means between said discharge plate and said drive roller for severing strip material after said drive roller and said counter roller are moved out of engagement, sensing means adjacent said discharge roller adapted to engage the material fed by said feed roller and said counter roller and connected to said motor to interrupt said motor when a length of strip material is on said discharge plate, a spindle pivotally mounted adjacent its one end, first and second rotatable measuring wheels located on respective sides of said spindle, a rotatable clutch wheel rotatably mounted on said spindle and connected to said motor for rotation thereby, a slide member mounted adjacent said first and second measuring wheels, said measuring wheels each having an actuating element adapted to contact said slide member upon rotation of said wheels to displace said slide member, a motor cut-off switch connected to said motor and disposed adjacent said slide member in a position to be actuated upon displacement of said slide member to stop said motor and to actuate said cutter knife, first and second push buttons for operating first and second measuring wheels respectively, and solenoid switch means connected to said first and second push buttons and to said motor and to said spindle for displacing the spindle with the driving clutch wheel into engagement with the respective one of said first and second measuring wheels, to cause said driving clutch member to rotate said measuring wheel to engage said slide member and displace said slide member into contact with said switch means to cause stopping of said motor, including a first solenoid for shifting said spindle member toward engagement with said first measuring wheel and a second solenoid for shifting said spindle member toward engagement with a second solenoid wheel, and a stepping switch connected to said first and second solenoids with electrical means for selectively causing the operation of respective ones of said first and second solenoids during each operating cycle.

References Cited by the Examiner

UNITED STATES PATENTS

| | | | |
|---|---|---|---|
| 2,785,748 | 3/1957 | Von Stoeser et al. | 83—243 |
| 2,797,919 | 7/1957 | Hempel | 226—135 X |
| 3,086,417 | 4/1963 | Williams | 83—242 |
| 3,178,978 | 4/1965 | Eisenman | 83—208 |

ANDREW R. JUHASZ, *Primary Examiner.*